(12) United States Patent
Beijer

(10) Patent No.: US 12,290,934 B2
(45) Date of Patent: *May 6, 2025

(54) METHODS FOR USE IN MATERIAL PROCESSING OF A TWO-DIMENSIONAL SHEET LIKE MATERIAL

(71) Applicant: STILFOLD AB, Nacka Strand (SE)

(72) Inventor: Tue Beijer, Nacka Strand (SE)

(73) Assignee: STILFOLD AB, Nacka Strand (SE)

( * ) Notice: Subject to any disclaimer, the term of this patent is extended or adjusted under 35 U.S.C. 154(b) by 379 days.

This patent is subject to a terminal disclaimer.

(21) Appl. No.: 17/895,344

(22) Filed: Aug. 25, 2022

(65) Prior Publication Data

US 2023/0084575 A1 Mar. 16, 2023

(30) Foreign Application Priority Data

Aug. 30, 2021 (SE) .................................. 2151044-1

(51) Int. Cl.
*B25J 9/16* (2006.01)
*B21D 5/00* (2006.01)
(Continued)

(52) U.S. Cl.
CPC ............ *B25J 9/1671* (2013.01); *B21D 5/004* (2013.01); *B21D 5/16* (2013.01); *B25J 9/1661* (2013.01);
(Continued)

(58) Field of Classification Search
CPC ...... B25J 9/1671; B25J 9/1661; B25J 9/1669; G06F 30/00; B21D 5/004; B21D 5/16; G05B 19/4155; G05B 2219/50391
(Continued)

(56) References Cited

U.S. PATENT DOCUMENTS 2,442,943 A 6/1948 Wayne
2,868,265 A 1/1959 Williams
(Continued)

FOREIGN PATENT DOCUMENTS

CN 110 479 811 A 11/2019
GB 1524045 A 9/1978
JP 4221061 B2 2/2009

OTHER PUBLICATIONS

International Search Report issued in corresponding PCT Application No. PCT/SE2022/050763, dated Oct. 17, 2022, pp. 1-7.
(Continued)

*Primary Examiner* — Md Azad
(74) *Attorney, Agent, or Firm* — Knobbe Martens Olson & Bear LLP

(57) ABSTRACT

The disclosure relates to a method for material processing of a two-dimensional sheet like material. The method comprises: obtaining information related to a desired design of a three dimensional object; obtaining information related to material characteristics of the sheet like material; defining a primary surface and a secondary surface of the desired design; and defining a geometrical relationship between said primary surface and secondary surface, wherein the secondary surface is a reflection of the primary surface in a two dimensional plane, and wherein when said primary surface is concave said secondary surface is convex, or when said primary surface is convex said secondary surface is concave; and providing a digital instruction for a fully developed spreading and subsequent folding of a two dimensional sheet into the obtained desired design, wherein said digital instruction is based on the defined primary and secondary surfaces, respectively, and said obtained material characteristics.

17 Claims, 10 Drawing Sheets

(51) Int. Cl.
  *B21D 5/16* (2006.01)
  *G05B 19/4155* (2006.01)
  *G06F 30/00* (2020.01)
(52) U.S. Cl.
  CPC ........ *B25J 9/1669* (2013.01); *G05B 19/4155* (2013.01); *G06F 30/00* (2020.01); *G05B 2219/50391* (2013.01)
(58) Field of Classification Search
  USPC ....................................................... 700/145
  See application file for complete search history.

(56) References Cited

U.S. PATENT DOCUMENTS

| | | | |
|---|---|---|---|
| 5,188,135 | A | 2/1993 | Neumann et al. |
| 5,761,951 | A | 6/1998 | Codatto |
| 5,810,295 | A | 9/1998 | Anzel |
| 5,822,207 | A | 10/1998 | Hazxama et al. |
| 5,828,575 | A | 10/1998 | Sakai |
| 6,003,358 | A | 12/1999 | Lipari et al. |
| 6,098,440 | A | 8/2000 | Gorgen |
| 6,185,476 | B1* | 2/2001 | Sakai ................. G05B 19/4097 700/165 |
| 6,192,297 | B1 | 2/2001 | Marobin |
| 6,542,937 | B1 | 4/2003 | Kask et al. |
| 6,810,295 | B1 | 10/2004 | Hochenauer et al. |
| 6,938,454 | B2 | 9/2005 | Strasser et al. |
| 7,383,715 | B2 | 6/2008 | Kutschker |
| 8,285,413 | B1* | 10/2012 | Shoulders .............. B25J 9/1671 29/430 |
| 9,321,092 | B2 | 4/2016 | Takasue |
| 9,764,436 | B2 | 9/2017 | Ziegler |
| 12,115,681 | B2 | 10/2024 | Beijer |
| 2004/0237284 | A1 | 12/2004 | Nakamura |
| 2006/0090530 | A1 | 5/2006 | Hammer |
| 2006/0137779 | A1 | 6/2006 | Brodt |
| 2007/0175040 | A1 | 8/2007 | Bayer |
| 2010/0106463 | A1* | 4/2010 | Hindman ................ G06F 30/00 703/2 |
| 2011/0283851 | A1 | 11/2011 | Overrath |
| 2012/0067104 | A1 | 3/2012 | Keys |
| 2015/0142151 | A1* | 5/2015 | Todorov ................... G09F 1/06 700/98 |
| 2015/0273688 | A1 | 10/2015 | Harada et al. |
| 2015/0321300 | A1* | 11/2015 | Ziegler .................. B25J 11/005 29/564 |
| 2018/0318898 | A1* | 11/2018 | Troive ..................... B21D 5/01 |
| 2019/0197202 | A1* | 6/2019 | Voirin ..................... G06F 30/20 |
| 2021/0406424 | A1 | 12/2021 | König et al. |
| 2023/0080845 | A1 | 3/2023 | Beijer |

OTHER PUBLICATIONS

Written Opinion issued in corresponding PCT Application No. PCT/SE2022/050763, dated Oct. 17, 2022, pp. 1-11.
Extended European Search Report issued in corresponding EP Application No. 22192090.3, dated Apr. 17, 2023, pp. 1-9.
K.S.R.K. Pradas and P. Selvaraj, "On the considerations for the design of an automated aircraft sheet metal component production loft generation system," International Journal of Production Research, Taylor and Francis, GB, vol. 43, No. 14, Jul. 15, 2005, pp. 3045-3067.
Martin et al., "String Actuated Curved Folded Surfaces," AMM Transactions on Graphics, ACM, NY, US, vol. 36, No. 3, May 19, 2017, pp. 1-13.
Robert McNeel & Associates: "Rhino-Rhino Support," Jun. 13, 2021, https://web.archive.org/web/20210613142818/https://rhino3d.com/support; Gediminas Kirdeikis, "How to: Cruved Folding Simulation (Grasshopper), Jun. 21, 2020, UR::https://www.youtube.com/watch?v=Qmf4D9T7rnc; RoboFold Process," RoboFold, Oct. 11, 2014, https://webarchive.org/web/20141011144313/http://www.robofold.com/make/process/process-4.
Vergauwen et al, "Computational modelling methods for pliable structures based on curved-line folding—ScienceDirect," Computer-Aided Design, Feb. 1, 2017, https://www.sciencedirect.com/science/article/pii/S0010448516301282.
Chen et al., "Interactive Design of Planar Curved Folding by Reflection," Short Papers, Jan. 1, 2011, pp. 1-5, https://www.jst.go.jp/erato/igarashi/publications/001/PG2011.pdf.
Swedish Search Report issued in corresponding SE Application No. 2151044-1, dated Mar. 30, 2022, pp. 1-3.
J. Mitani et al. "Interactive Design of Planar Curved Folding by Reflection," Pacific Graphics, The Eurographics Association 2011, p. 1-5.

* cited by examiner

METHODS FOR USE IN MATERIAL PROCESSING OF A TWO-DIMENSIONAL SHEET LIKE MATERIAL

CROSS-REFERENCE TO RELATED APPLICATION

This application claims priority to Swedish patent application no. SE 2151044-1, filed on Aug. 30, 2021, the disclosure of which is hereby expressly incorporated by reference in its entirety.

TECHNICAL FIELD

The present disclosure generally relates to material processing of a two-dimensional sheet like material into a three-dimensional shape object, typically a desired three-dimensional shape object.

More specifically, some aspects of this disclosure relate to i) a method performed by a computer device for use in material processing of a two-dimensional sheet like material, ii) a corresponding computer device, iii) a three-dimensional shape object formed by the method, iv) the use of said object as well as v) a corresponding computer program.

Further aspects of this disclosure relate to a method performed by an industrial robot, which complement the above-mentioned method performed by the computer device. In other words, some aspects of this disclosure relate to i) a method performed by an industrial robot for material processing of a two-dimensional sheet like material, ii) a corresponding industrial robot, iii) a three-dimensional shape object formed by the method, iv) the use of said object as well as v) a corresponding computer program.

BACKGROUND

Bending or folding sheet materials, or sheet like materials is one of the most common operations performed in industrial manufacturing.

Bending a sheet material is typically performed by applying a force to the material, which force must also generally exceed the material's yield strength to achieve a plastic deformation. There are a number of conventional methods for bending sheet materials. Most of these conventional methods use a die for bending, such as V-bending, bottoming, air bending, coining, U-bending, step bending, all constrained by the radius needed, the flange length of the tool and die, and the force needed for bending. Another method is roll bending, used for making tubes or cones, or rotary bending.

Usually critical dimensions that need to be considered when setting up sheet metal in a CAD software are sheet metal thickness, the k-factor and bend radius. Materials such as aluminium typically requires less force, and materials such as stainless steels require more force as compared to a conventional steel with a yield strength around 400 mPa. However, bending or folding a blank sheet material, i.e., a substantially two-dimensional object into a three-dimensional shape or object has its limitations, even in the design phase and conversion into for instance a Computer Aided Design (CAD) instruction.

Conventionally a steel, or similar, material can only be folded in one dimension at a time. This means that in conventional construction of three-dimensional objects they must often be pieced and welded together by many different parts and that spreading of the three-dimensional shape on the two-dimensional sheet involves cutting out individual pieces. In some applications a three-dimensional object may be constructed by sequential folding in one dimension. This places constraints on both the use of material as well as the final design of the desired three-dimensional object.

This patent application is filed concurrently with the applications as per below and filed by the same applicant. Details on specific issues in the various patent applications are to be considered as incorporated into each one of the other related patent applications.

The related European patent applications are titled:

Methods for use in material processing of a two-dimensional sheet like material.

A system, a computer device and an industrial robot for use in material processing of a two-dimensional sheet like material.

Computer programs for use in computer devices and industrial robots used in material processing of a two-dimensional sheet like material.

The related U.S. patent applications are titled:

A system, a computer device and an industrial robot for use in material processing of a two-dimensional sheet like material.

Non-transitory computer-readable medium comprising executable instructions for use in computer devices and industrial robots used in material processing of a two-dimensional sheet like material.

The related PCT patent application is titled:

Processing of a two-dimensional sheet like material.

SUMMARY

It is in view of the above considerations and others that the embodiments described in this disclosure have been made. This disclosure recognizes the fact that there is a need for improved techniques for folding two dimensional sheets into three dimensional objects.

It is therefore a general object of some aspects and embodiments described throughout the present disclosure to provide improved techniques for processing of two dimensional sheets. It would also be advantageous to allow for the provision of an object folded by said method and uses thereof.

The object is addressed by the appended independent claims.

Advantageous embodiments are set forth in the appended dependent claims and in the following description.

According to a first aspect there is provided a method performed by a computer device for material processing of a two-dimensional sheet like material. The method comprises: obtaining information related to a design of a three dimensional object, obtaining information related to material characteristics of said material to a computer device, defining at least one primary surface and at least one corresponding secondary surface, and a geometrical relationship between said primary surface and corresponding secondary surface, wherein the secondary surface is a reflection of the primary surface in a two dimensional plane, and wherein if said primary surface is concave said secondary surface is convex, or if said primary surface is convex said secondary surface is concave; providing a digital instruction for spreading and subsequent folding of a two dimensional sheet, wherein said digital instruction is based on the defined primary and secondary surfaces, respectively, and said material characteristics.

In some embodiments, providing said digital instruction for spreading and subsequent folding of a two-dimensional sheet comprises transmitting, or otherwise sending, said digital instruction to an industrial robot for the spreading and subsequent folding of the two-dimensional sheet by means of the industrial robot.

For example, the industrial robot may be located remotely from the computer device.

Conventionally a steel, or similar materials, can only be bend or folded in one dimension at a time. This means that in conventional construction of three-dimensional steel objects, i.e. metal sheet design consisting of curved surfaces traditionally needs to be stamped or put together with different parts.

By the inventive method, where a, to a primary surface corresponding, secondary surface is defined, it is possible to create a digital instruction for a fully developed spreading and subsequent folding a two-dimensional sheet into a three-dimensional shaped object, without piecing together many different parts. By fully developed spreading is meant that the surfaces of the two-dimensional sheet object are pieced together, which means that the three-dimensional object formed thereof does not require piecing together many different parts. The implementation of curve folding enables creation of a larger volume for a technical volume, e.g. batteries or other equipment, without compromising the design. This is largely because with the curve folding it is possible to incorporate a volume without additional folds, as compared to folding over straight lines.

As used herein, computer device is meant to be any device capable of obtaining (e.g. receiving) and processing the information as defined above. Typically, the computer device is also capable of providing (e.g., transmitting) the digital instruction to an industrial robot as described above. The computer device may, for example, be implemented as a desktop computer, a laptop computer, a tablet computer or a smartphone.

Generally, a Computer Aided Design (CAD) program may be used on the computer device. The above defined method may for instance be implemented as an add-on computer program to a conventional CAD program and run on any suitable computer device as will be further described herein.

According to the first aspect said folding may be performed by folding along a curve of the two-dimensional sheet, wherein said curve is defined over a two-dimensional plane.

The implementation of curve folding enables creation of a larger volume for a technical volume, e.g. batteries or other equipment, without compromising the design. This is due to the curve folding process where it is possible to incorporate a larger volume without additional folds, as compared to conventional folding over straight lines or. Curve folding thus further requires less numbers of folds get around a volume.

According to the first aspect where said two-dimensional plane crosses a single folded surface an intersection is created, and wherein the secondary surface is a reflection of the surface under said two-dimensional plane and is reflected through said two-dimensional plane. The secondary surface is a reflection of the continuation of the primary surface through the two-dimensional folding plane.

This means that the intersection of the two-dimensional plane and the primary surface creates the curve defined on the two-dimensional plane, which allows for a precise definition of the three-dimensional design and fully developed spreading. The definition of the secondary surface is fundamental for the fully developed spreading to be achieved. Two-dimensional plane may also be the described as a folding plane.

The material characteristics may be any one or a combination of thickness, type of material, hardness toughness, tensile strength, yield strength, elongation, fatigue strength, corrosion, plasticity, malleability, creep and structure of the material and dimension of material, and wherein said material characteristics define boundary conditions for said folding of said two-dimensional sheet. Alternatively, other, or different material characteristics are used as input to the computer device.

According to one alternative of the first aspect the primary surface may be the surface that controls the design of three-dimensional object.

According to another alternative the curve may control the design of three-dimensional object.

The three-dimensional shape design may further be defined by an interface design based on a technical volume and ergonomic requirements of the three-dimensional shape object.

The inventive curve folding method thus allows for an integration of design and construction of the three-dimensional object, which may for instance be a vehicle such as a moped or a motorcycle. The technical volume may for instance be the battery, steering and other technical devices needed, and the ergonomic requirements may for instance be the shape of the saddle etc.

According to the first aspect the folding may be performed by industrial robots through straight intersections of said curve fold.

The industrial robot may have one or more robotic arms. The folding may be performed by conventional folding operations such as e.g. roller folding. Roller folding is a preferred folding operation by the industrial robot, enabling folding of the material in an easy way. Further by using industrial robots for the folding of the two-dimensional sheet a digital instruction may be created at a location remote from the digital robot. The digital instruction may be provided to several industrial robots at different location as the same time, which allows for an agile and decentralized production process, which can be adapted to the customer needs, and also reduces the need for shipment of the three-dimensional object. As an example, a digital instruction for folding a metal sheet into a motorcycle may be created at a design studio and be sent to a production facility close to the customer, instead of the motorcycle being assembled at one single location and shipped to the customer.

According to the first aspect the folding may be performed such that at least one composite pair of a convex and concave surfaces is formed, thereby forming said three-dimensional shaped object. This means that the number of folds may be any one from one to an infinite amount of folds. Even further once a fold has been performed along one predefined curve another fold may be performed along another predefined curve.

The two-dimensional sheet material may be any one of a metal or plastics material, and said metal material may be any one of a steel, a stainless steel and an aluminum.

According to one alternative, the material may be a stainless steel having a yield strength in the range of 1100 to 1400 MPa and a thickness in the range of 1 to 1.50 mm, and wherein said material is folded without prior tempering of said material.

The yield strength is a measurement of the force required to start the deformation of the material i.e. bending or folding the material. Steel conventionally requires tempering otherwise it remains very brittle. Through the inventive method it has surprisingly been found that the digital instruction for a fully developed spreading and the industrial robot folding allows for folding the blank metal sheet material without prior heat treatment, since the threshold for plastic deformation of the material can be reached, i.e. the inertia reached is large enough for folding even a brittle material, without breaking it, and for it to remain in the folded state.

According to a second aspect there is provided an object in form of a three-dimensional geometrical shape, wherein said material has been folded from a two-dimensional sheet material into said three-dimensional geometrical shape object by the method according to the first aspect.

According to a third aspect there is provided the use of the object as defined in the second aspect for the manufacture of any one of a vehicle, a furniture and a tool.

According to a fourth aspect, there is provided a computer program comprising instructions which, when executed on at least one processor, cause the at least one processor to carry out the method according to the above described first aspect.

A carrier may also be provided. The carrier comprises the computer program according to the fourth aspect. The carrier may for example be one of an electronic signal, an optical signal, a radio signal or a computer readable storage medium.

According to a fifth aspect, there is provided a computer device comprising a processor and a memory. The memory comprises instructions executable by said processor whereby said computer device is operative to perform the method according to the first aspect.

According to a sixth aspect there is provided at least one industrial robot adapted to receive a digital instruction according to the first aspect of the invention.

In the following, additional aspects and embodiments of the present disclosure will be summarized in further detail.

According to a seventh aspect, there is provided a method performed by a computer device for use in material processing of a two-dimensional sheet like material. The method comprises:

obtaining information related to a desired design of a three-dimensional object, obtaining information related to material characteristics of the two-dimensional sheet like material, defining a primary surface and a secondary surface of the desired design of the three-dimensional object, and defining a geometrical relationship between said primary surface and secondary surface, wherein the secondary surface is a reflection of the primary surface in a two-dimensional plane, and wherein when said primary surface is concave said secondary surface is convex, or when said primary surface is convex said secondary surface is concave; and providing, or otherwise creating, a digital instruction for a fully developed spreading and subsequent folding of a two-dimensional sheet into the obtained desired design of the three-dimensional object, wherein said digital instruction is based on the defined primary and secondary surfaces, respectively, and said obtained material characteristics.

In some embodiments, the method may further comprise: transmitting said digital instruction to an industrial robot for the spreading and subsequent folding of the two-dimensional sheet by means of the industrial robot.

In some embodiments, the computer device is integral with the industrial robot.

In other embodiments, the industrial robot is separate and distinct from the computer device. For example, the industrial robot may be located remotely from the computer device.

In some embodiments, said folding is performed by folding along a curve of the two-dimensional sheet, and said curve is defined over a two-dimensional plane. In some embodiments, where said two-dimensional plane crosses a single folded surface an intersection is created, wherein the secondary surface is a reflection of the surface under said two-dimensional plane and is reflected through said two-dimensional plane.

In some embodiments, said material characteristics are any one or a combination of thickness, type of material, hardness toughness, tensile strength, yield strength, elongation, fatigue strength, corrosion, plasticity, malleability, creep and structure of the material and dimension of material. Furthermore, said material characteristics define boundary conditions for said folding of said two-dimensional sheet.

In some embodiments, said primary surface is the surface that controls the desired design of three-dimensional object.

In some embodiments, said curve controls the desired design of three-dimensional object.

In some embodiments, said desired design of three-dimensional shape is further defined by an interface design based on a technical volume and ergonomic requirements of the three-dimensional shape object.

In some embodiments, the folding is performed by said industrial robot through straight intersections of said curve fold. In some embodiments, said folding is performed such that at least one composite pair of a convex and concave surfaces is formed, thereby forming said desired design of the three-dimensional object.

In some embodiments, said two-dimensional sheet material is any one of a metal or a plastics material. For example, said metal is any one of a steel, a stainless steel and an aluminum. For example, said metal may be a stainless steel having a yield strength in the range of 1100 to 1400 MPa and a thickness in the range of 1 to 1.50 mm, characterized in that said metal is folded without prior tempering of said material.

According to an eighth aspect, there is provided an object in form of a three-dimensional geometrical shape, wherein said object has been folded from a two-dimensional sheet material into said three-dimensional geometrical shape object using, or otherwise utilizing, the method of the seventh aspect.

According to a ninth aspect, there is provided a use of the object of the eighth aspect for the manufacture of any one of a vehicle (e.g., a motorbike), a furniture, or a tool.

According to a tenth aspect, there is provided a computer program comprising instructions which, when executed on at least one processor, cause the at least one processor to carry out the method according to the seventh aspect. A carrier comprising the computer program of the tenth aspect may also be provided. The carrier may for instance be one of an electronic signal, an optical signal, a radio signal or a computer readable storage medium.

According to an eleventh aspect, there is provided a computer device for use in material processing of a two-dimensional sheet like material.

In a first implementation, the computer device comprises a processor and a memory, said memory comprising instructions executable by said processor whereby said computer device is operative to perform the method according to the seventh aspect.

In a second implementation, the computer device comprises:
   means adapted to obtain information related to a desired design of a three-dimensional object,
   means adapted to obtain information related to material characteristics of the two-dimensional sheet like material,
   means adapted to define a primary surface and a secondary surface of the desired design of the three-dimensional object, and
   means adapted to define a geometrical relationship between said primary surface and secondary surface, wherein
   the secondary surface is a reflection of the primary surface in a two-dimensional plane, and wherein
   when said primary surface is concave said secondary surface is convex, or when said primary surface is convex said secondary surface is concave; and
   means adapted to provide, or otherwise create, a digital instruction for a fully developed spreading and subsequent folding of a two-dimensional sheet into the obtained desired design of the three-dimensional object, wherein said digital instruction is based on the defined primary and secondary surfaces, respectively, and said obtained material characteristics.

In some embodiments, the computer device comprises means adapted to transmit said digital instruction to an industrial robot for the spreading and subsequent folding of the two-dimensional sheet by means of the industrial robot.

In some embodiments, the computer device may be integral with the industrial robot.

In other embodiments, the industrial robot may be separate and distinct from the computer device. For example, the industrial robot may be located remotely from the computer device.

In some embodiments, said folding is performed by folding along a curve of the two-dimensional sheet, wherein said curve is defined over a two-dimensional plane.

In some embodiments, where said two-dimensional plane crosses a single folded surface an intersection is created, and the secondary surface is a reflection of the surface under said two-dimensional plane and is reflected through said two-dimensional plane.

In some embodiments, said material characteristics are any one or a combination of thickness, type of material, hardness toughness, tensile strength, yield strength, elongation, fatigue strength, corrosion, plasticity, malleability, creep and structure of the material and dimension of material, and wherein said material characteristics define boundary conditions for said folding of said two-dimensional sheet.

In some embodiments, said primary surface is the surface that controls the desired design of three-dimensional object.

In some embodiments, said curve controls the desired design of three-dimensional object.

In some embodiments, said desired design of three-dimensional shape is further defined by an interface design based on a technical volume and ergonomic requirements of the three-dimensional shape object.

In some embodiments, the folding is performed by said industrial robot through straight intersections of said curve fold.

In some embodiments, said folding is performed such that at least one composite pair of a convex and concave surfaces is formed, thereby forming said desired design of the three-dimensional object.

In some embodiments, said two-dimensional sheet material is any one of a metal or a plastics material.

In some embodiments, said metal material is any one of a steel, a stainless steel and an aluminum. For example, said metal material may be a stainless steel having a yield strength in the range of 1100 to 1400 MPa and a thickness in the range of 1 to 1.50 mm, characterized in that said metal material is folded without prior tempering of said material.

In a third implementation, the computer device comprises a processor and a memory. Said memory comprises instructions executable by said processor whereby said computer device is operative to:
   obtain information related to a desired design of a three-dimensional object,
   obtain information related to material characteristics of the two-dimensional sheet like material,
   define a primary surface and a secondary surface of the desired design of the three-dimensional object, and
   define a geometrical relationship between said primary surface and secondary surface, wherein
      the secondary surface is a reflection of the primary surface in a two-dimensional plane, and wherein
      when said primary surface is concave said secondary surface is convex, or when said primary surface is convex said secondary surface is concave; and
   provide, or otherwise create, a digital instruction for a fully developed spreading and subsequent folding of a two-dimensional sheet into the obtained desired design of the three-dimensional object, wherein said digital instruction is based on the defined primary and secondary surfaces, respectively, and said obtained material characteristics.

In some embodiments, the computer device may further comprise a transmitter configured to transmit said digital instruction to an industrial robot for the spreading and subsequent folding of the two-dimensional sheet by means of the industrial robot.

In some embodiments, the computer device may be integral with the industrial robot.

In some embodiments, the industrial robot may be separate and distinct from the computer device. In some embodiments, the industrial robot may be located remotely from the computer device.

In some embodiments, said folding is performed by folding along a curve of the two-dimensional sheet, wherein said curve is defined over a two-dimensional plane.

In some embodiments, where said two-dimensional plane crosses a single folded surface an intersection is created, and the secondary surface is a reflection of the surface under said two-dimensional plane and is reflected through said two-dimensional plane.

In some embodiments, said material characteristics are any one or a combination of thickness, type of material, hardness toughness, tensile strength, yield strength, elongation, fatigue strength, corrosion, plasticity, malleability, creep and structure of the material and dimension of material, and wherein said material characteristics define boundary conditions for said folding of said two-dimensional sheet.

In some embodiments, said primary surface is the surface that controls the desired design of three-dimensional object.

In some embodiments, said curve controls the desired design of three-dimensional object.

In some embodiments, said desired design of three-dimensional shape is further defined by an interface design based on a technical volume and ergonomic requirements of the three-dimensional shape object.

In some embodiments, the folding is performed by said industrial robot through straight intersections of said curve fold.

In some embodiments, said folding is performed such that at least one composite pair of a convex and concave surfaces is formed, thereby forming said desired design of the three-dimensional object.

In some embodiments, said two-dimensional sheet material is any one of a metal or plastics material.

In some embodiments, said metal material is any one of a steel, a stainless steel and an aluminum.

In some embodiments, said material is a stainless steel having a yield strength in the range of 1100 to 1400 MPa and a thickness in the range of 1 to 1.50 mm, characterized in that said material is folded without prior tempering of said material.

In a fourth implementation, the computer device comprises:
a first module configured to obtain information related to a desired design of a three-dimensional object,
a second module configured to obtain information related to material characteristics of the two-dimensional sheet like material,
a third module configured to define a primary surface and a secondary surface of the desired design of the three-dimensional object, and
a fourth module configured to define a geometrical relationship between said primary surface and secondary surface, wherein
the secondary surface is a reflection of the primary surface in a two-dimensional plane, and wherein
when said primary surface is concave said secondary surface is convex, or when said primary surface is convex said secondary surface is concave; and
a fifth module configured to provide, or otherwise create, a digital instruction for a fully developed spreading and subsequent folding of a two-dimensional sheet into the obtained desired design of the three-dimensional object, wherein said digital instruction is based on the defined primary and secondary surfaces, respectively, and said obtained material characteristics.

In some embodiments, the first, second, third, fourth and/or fifth modules combined into one common module.

In some embodiments, the computer device may further comprise a transmitter configured to transmit said digital instruction to an industrial robot for the spreading and subsequent folding of the two-dimensional sheet by means of the industrial robot.

In some embodiments, the computer device may be integral with the industrial robot.

In some embodiments, the industrial robot may be separate and distinct from the computer device. In some embodiments, the industrial robot is located remotely from the computer device.

In some embodiments, said folding is performed by folding along a curve (CF) of the two-dimensional sheet, wherein said curve is defined over a two-dimensional plane.

In some embodiments, where said two-dimensional plane crosses a single folded surface an intersection is created, and the secondary surface is a reflection of the surface under said two-dimensional plane and is reflected through said two-dimensional plane.

In some embodiments, said material characteristics are any one or a combination of thickness, type of material, hardness toughness, tensile strength, yield strength, elongation, fatigue strength, corrosion, plasticity, malleability, creep and structure of the material and dimension of material, and wherein said material characteristics define boundary conditions for said folding of said two-dimensional sheet.

In some embodiments, said primary surface is the surface that controls the desired design of three-dimensional object.

In some embodiments, said curve controls the desired design of three-dimensional object.

In some embodiments, said desired design of three-dimensional shape is further defined by an interface design based on a technical volume and ergonomic requirements of the three-dimensional shape object.

In some embodiments, the folding is performed by said industrial robot through straight intersections of said curve fold.

In some embodiments, said folding is performed such that at least one composite pair of a convex and concave surfaces is formed, thereby forming said desired design of the three-dimensional object.

In some embodiments, said two-dimensional sheet material is any one of a metal or plastics material.

In some embodiments, said metal material is any one of a steel, a stainless steel and an aluminum.

In some embodiments, said material is a stainless steel having a yield strength in the range of 1100 to 1400 MPa and a thickness in the range of 1 to 1.50 mm, characterized in that said material is folded without prior tempering of said material.

According to a twelfth aspect, there is provided a method performed by an industrial robot for material processing of a two-dimensional sheet like material. The method comprises:
providing a two-dimensional sheet like material;
obtaining a digital instruction for the spreading and subsequent folding of the provided two-dimensional sheet by means of the industrial robot;
executing the obtained digital instruction to produce, or otherwise create, a desired design of a three-dimensional object from the provided two-dimensional sheet like material.

As will be appreciated, the digital instruction has advantageously been created, produced or otherwise provided by using or otherwise utilizing any of the above-mentioned methods performed by the computer device.

In some embodiments, obtaining the digital instruction for the spreading and subsequent folding of the provided two-dimensional sheet by means of the industrial robot comprises: receiving said digital instruction from a computer device.

In some embodiments, the computer device may be integral with the industrial robot.

In some embodiments, the industrial robot may be separate and distinct from the computer device.

In some embodiments, the industrial robot may be located remotely from the computer device.

According to a thirteenth aspect, there is provided a computer program comprising instructions which, when executed on at least one processor, cause the at least one processor to carry out the method according to the twelfth aspect.

A carrier comprising the computer program of the thirteenth aspect may also be provided. The carrier may for example be one of an electronic signal, an optical signal, a radio signal or a computer readable storage medium.

According to a fourteenth aspect, there is provided an industrial robot for material processing of a two-dimensional sheet like material.

According to a first implementation, the industrial robot may comprise a processor and a memory, said memory comprising instructions executable by said processor whereby said computer device is operative to perform the method according to the twelfth aspect.

According to a second implementation, the industrial robot may comprise:

means adapted to provide a two-dimensional sheet like material;

means adapted to obtain a digital instruction for the spreading and subsequent folding of the provided two-dimensional sheet by means of the industrial robot;

means adapted to execute the obtained digital instruction to produce, or otherwise create, a desired design of a three-dimensional object from the provided two-dimensional sheet like material.

In some embodiments, the industrial robot mat comprise means adapted to receive said digital instruction from a computer device.

In some embodiments, the computer device may be integral with the industrial robot.

In some embodiments, the industrial robot may be separate and distinct from the computer device. In some embodiments, the industrial robot may be located remotely from the computer device.

According to a third implementation, the industrial robot comprises a processor and a memory, said memory comprising instructions executable by said processor whereby said industrial robot is operative to:

provide a two-dimensional sheet like material;

obtain a digital instruction for the spreading and subsequent folding of the provided two-dimensional sheet by means of the industrial robot; and execute the obtained digital instruction to produce, or otherwise create, a desired design of a three-dimensional object from the provided two-dimensional sheet like material.

In some embodiments, said memory further comprises instructions executable by said processor whereby said industrial robot is operative to: receive, via a receiver, said digital instruction from a computer device.

In some embodiments, the computer device may be integral with the industrial robot.

In some embodiments, the industrial robot is separate and distinct from the computer device. For example, the industrial robot may be located remotely from the computer device.

According to a fourth implementation, the industrial robot comprises:

a first module configured to provide a two-dimensional sheet like material;

a second module configured to obtain a digital instruction for the spreading and subsequent folding of the provided two-dimensional sheet by means of the industrial robot; and a third module configured to execute the obtained digital instruction to produce, or otherwise create, a desired design of a three-dimensional object from the provided two-dimensional sheet like material.

In some embodiments, the first, second and/or third modules may be combined into one common module.

In some embodiments, the industrial robot further comprises a receiver configured to receive, via a receiver, said digital instruction from a computer device.

In some embodiments, the computer device may be integral with the industrial robot.

In some embodiments, the industrial robot may be separate and distinct from the computer device. For example, the industrial robot may be located remotely from the computer device.

According to a fifteenth aspect, there is provided an object in form of a three-dimensional geometrical shape, wherein said object has been folded from a two-dimensional sheet material into said three-dimensional geometrical shape object by the method of the twelfth aspect.

According to a sixteenth aspect, there is provided a use of the object of the fifteenth aspect for the manufacture of any one of a vehicle (e.g., a motorbike), a furniture, or a tool.

According to a seventeenth aspect, there is provided a system. The system comprises a computer device and an industrial robot. The system may be realized in a distributed computing environment. The computer device may be realized according to any one of the above-mentioned aspects with respect to the computer device. Likewise, the industrial robot may be realized according to any one of the above-mentioned aspects with respect to the industrial robot.

According to an eighteenth aspect, there is provided an object in form of a three-dimensional geometrical shape. Said object has been folded from a two-dimensional sheet material into said three-dimensional geometrical shape object by means of the system of the seventeenth aspect.

According to a nineteenth aspect, there is provided a use of the object of the eighteenth aspect for the manufacture of any one of a vehicle (e.g., a motorbike), a furniture, or a tool.

Various aspects and embodiments described herein allow for an enhanced technique of material processing. The inventor has realized that where a, to a primary surface corresponding, secondary surface is defined, it is possible to create a digital instruction for a fully developed spreading and subsequent folding a two-dimensional sheet into a desired three-dimensional shaped object, without piecing together many different parts. By fully developed spreading is meant that the surfaces of the two-dimensional sheet object are pieced together, which means that the desired three-dimensional object formed thereof does not require piecing together many different parts. The implementation of curve folding enables creation of a larger volume for a technical volume, e.g. batteries or other equipment, without compromising the design. This is largely because with the curve folding it is possible to incorporate a volume without additional folds, as compared to folding over straight lines.

Furthermore, it is advantageous to allow for a distributed computing solution. This adds flexibility in that the digital instruction can be provided, or otherwise created, by a computer device at one location and being sent to an industrial robot(s) at a second (another) location for the material processing per se of the two-dimensional sheet material into the desired three-dimensional shape object. For example, the computer device may be located in Sweden and the industrial robot(s) in Australia. In a possible use case scenario, a user in Sweden defines a desired 3D object as well as material characteristics for the two-dimensional material desired to be used in the material processing. A computer device operated by the user in Sweden can obtain information related to the desired 3D design and the material characteristics of the two-dimensional material desired to be used in the material processing. A digital instruction for a fully developed spreading and subsequent folding of a two-dimensional sheet into the obtained desired design of the three-dimensional object can then be provided, wherein this digital instruction is based on defined primary and secondary surfaces, respectively, and said material characteristics. The digital instruction may be communicated to the industrial robot(s) in Australia. When the two-dimensional material is provided to the industrial robot(s) in Australia and said industrial robot(s) receive(s) the digital instruction, the industrial robot(s) may execute the digital instruction and thereby create, or otherwise, produce the desired 3D design. In addition to the flexibility, this also allows for additional dimensions in customization of the production of 3D objects in different materials such as metal or plastics materials. It is also believed that this distributed solution for the material processing may advantageously reduce the overall CO2 footprint when manufacturing certain products such as vehicles (e.g., motor bikes), furniture or the like.

BRIEF DESCRIPTION OF DRAWINGS

Aspects and embodiments of the present solution will now be described, by way of example, with reference to the accompanying schematic drawings.

DETAILED DESCRIPTION

Figure 1:
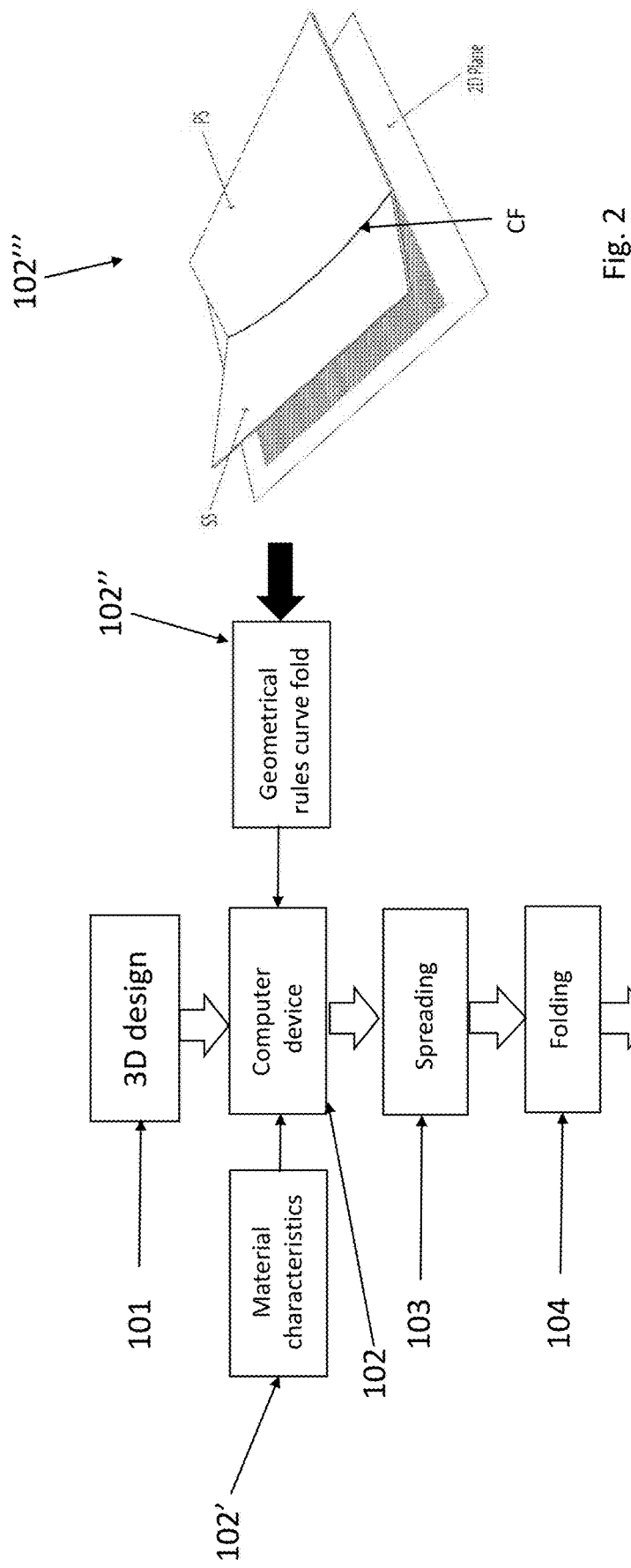
FIG. 1 shows a flow chart of the inventive method in accordance with an aspect of the invention.

FIG. 1 illustrates the method for material processing of a two-dimensional sheet like material. In step 101 information related to a design of a three-dimensional object is provided to a computer device 102. In other words, the computer device obtains (e.g., receives) information related to a design of a three-dimensional object. The computer device may be any suitable data processing device but is generally a computer implementing software advantageously for design and constructional computer programs such as computer-aided design (CAD). The inventive method may for instance be implemented as an add-on program for any conventional CAD software. Generally, the design is created in a CAD program and the inventive method may for instance be applied to the design through the computer device.

Information related to material characteristics is provided 102' to said computer device, for instance by an operator feeding the specific data into to computer machine, or alternatively by using automated or integrated processes for defining the material characteristics. In other words, the computer device 102 obtains (e.g., receives) the information related to the material characteristics. In step 102" the computer device 102 defines, or otherwise determines, at least one primary surface and at least one secondary surface of the design, and a geometrical relationship 102''' between said primary surface and secondary surface. The determination of the primary and secondary surface is performed through mathematical operations known to the skilled person, which must be combined with the material characteristics in order to achieve the desired result of the method according to the invention, i.e. the digital instruction for spreading and subsequent folding 104 of a two-dimensional sheet into a three-dimensional shape or object. The mathematical geometry and rules on their own only provide an indication of this end result.

The output from the computer device is a digital instruction for spreading 103, which is a fully developed spread of the three-dimensional shape object onto the two-dimensional sheet. In a fully developed spread all surfaces are connected or attached, as opposed to a conventional spread where the surfaces that subsequently form a three-dimensional shape must be cut out to of individual pieces that are pieced together by for instance welding, by the inventive method each curve fold thus eliminates one welding section. This means that after the folding process the three-dimensional object could be unfolded to a whole two-dimensional sheet again. In the fully developed spread the curve along which the fold is to be made is thus defined over a two-dimensional plane. The digital instruction may also comprise instructions for cutting said two-dimensional sheet if needed. In those cases, the surfaces may be welded, e.g. laser welded, in a two-dimensional phase and then folded into the three-dimensional shape or design object.

The inventive method thus requires a combination of the geometrical rules and the material characteristics to create the digital instruction and the definition of the secondary surface needed for the fully developed spread.

Figure 2:
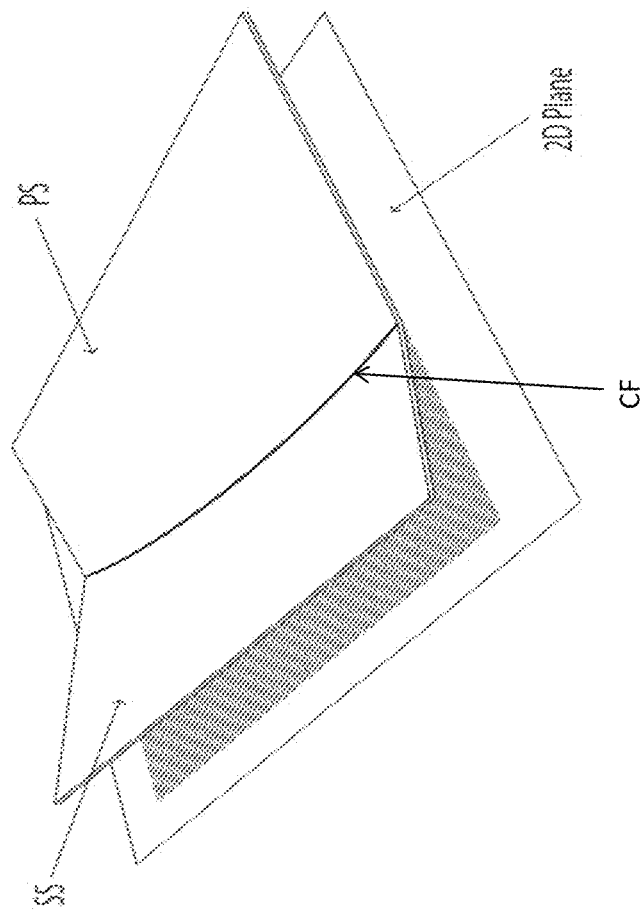
FIG. 2 shows a geometrical relationship between a primary and secondary surface.
Figure 3:
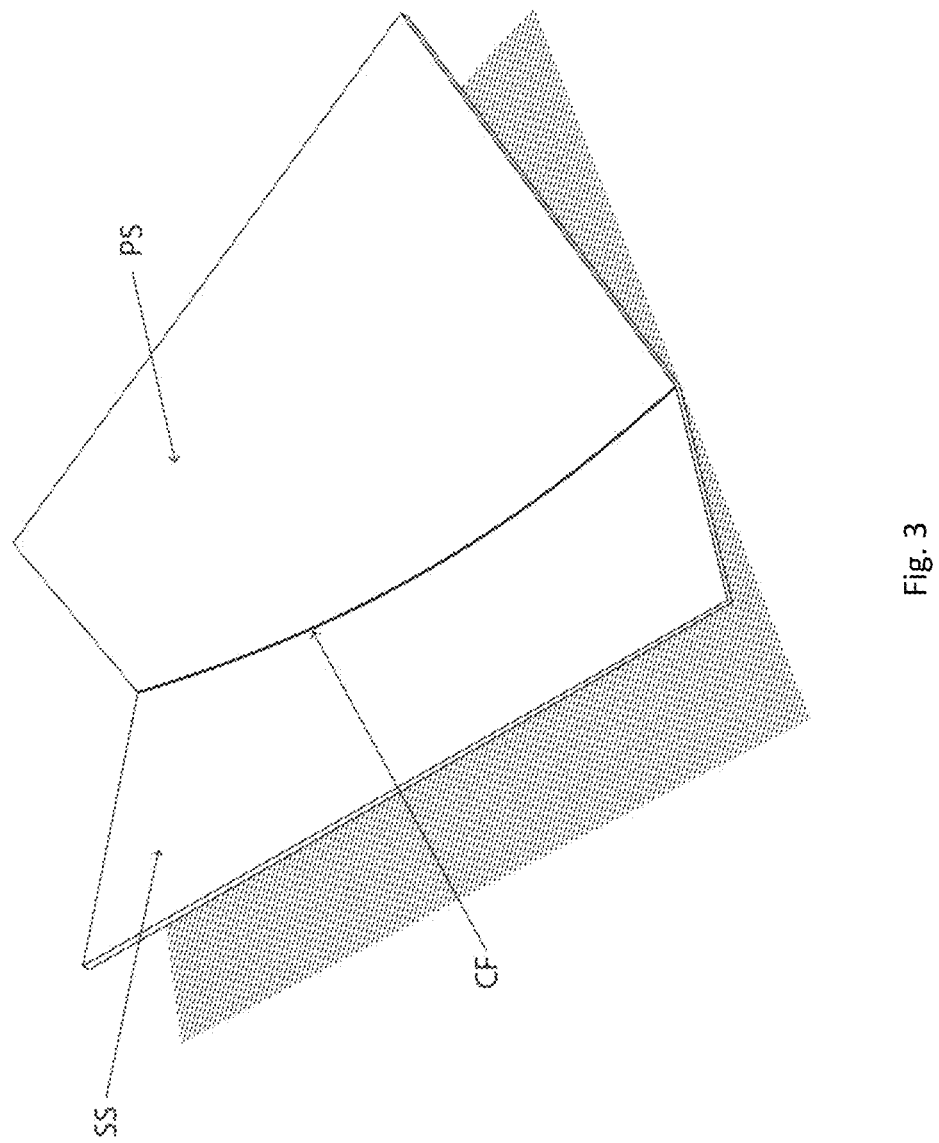
FIG. 3 shows a curve fold and a primary and secondary surface.

Illustrated in FIG. 2 is the geometrical relationship between the secondary surface SS and primary surface PS which is determined by the geometrical rules for folding or bending a sheet material along a curve fold CF. As illustrated the secondary surface SS is a reflection of the primary surface PS in a two-dimensional plane, 2D plane. Further, if said primary surface PS is concave said secondary surface SS is convex, or if said primary surface PS is convex said secondary surface SS is concave, which is also illustrated in FIG. 3. The relationship between the single curved surface and the primary surface and secondary surface defining the curve fold is further illustrated in FIGS. 11a and 11b, respectively.

The digital instruction for folding 104 or bending the two-dimensional sheet material into a three-dimensional shaped object may be provided to an industrial robot that is configured to perform the folding operation. In other words, the digital instruction may be transmitted or otherwise sent to an industrial robot for subsequent material processing. The industrial robot may be located remotely from the computer device.

In conventional folding of a two-dimensional sheet a curve is defined on a two-dimensional plane, and the result of the folding is a single folded convex surface on one side of curve and a single folded concave surface on the other side of the curve.

In the inventive method the secondary SS and primary surface PS and the curve fold CF is defined, and the concave and convex surfaces are spread on the two-dimensional plane of the sheet. This allows for the folding of a double folded surface.

Figure 4:
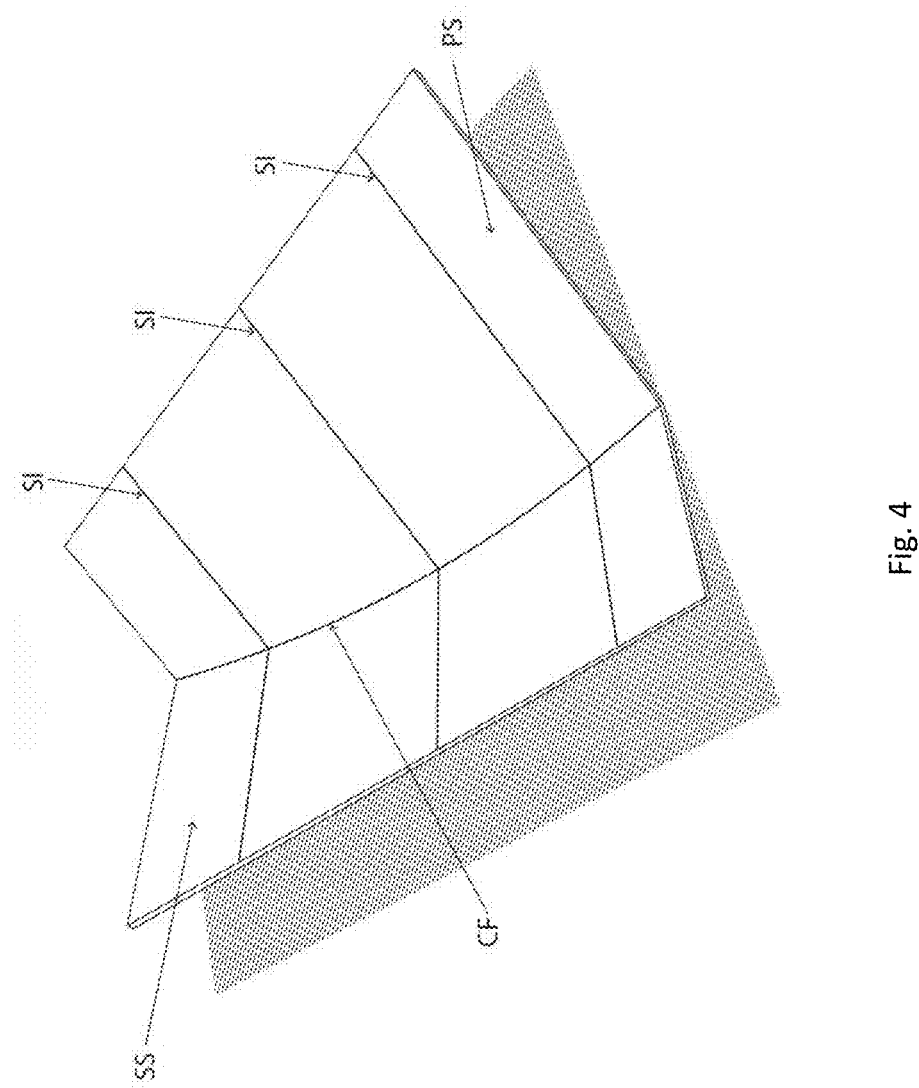
FIG. 4 shows how a curve fold is created.

FIG. 4 illustrates that the curve fold is created in a folding process, as operated by industrial robots, along a single folded surface through straight intersections SI of said curve fold CF, thus creating at least one composite pair of a convex and concave surfaces is formed, thereby subsequently forming said three-dimensional shaped object. The folding is thus performed by folding along a curve of the two-dimensional sheet, wherein said curve is defined over a two-dimensional plane. This is also further illustrated in FIGS. 11a and 11b.

As used herein, an industrial robot is meant to be a robot for manufacture which is automated, programmable and capable of movement on three or more axes. The setup or programming of motions and sequences for an industrial robot is typically taught by linking the robot controller to a laptop, desktop computer or (internal or Internet) network, i.e. such as the computer device 102. Further to this, the method may be performed by any manufacturing machinery capable of being programmable in accordance with the present disclosure.

The folding operation may, according to one embodiment, be performed by at least two robotic arms which simultaneously an on opposite sides of the sheet material, move along a curve fold, for instance by using a roller folding operation.

The sheet material may be any suitable material for folding, depending on the requirement of final three-dimensional object.

In one embodiment the material is a plastics material.

In another, more preferred embodiment, the material is a metal material. Alternatives of metal materials may be a steel, or a stainless steel or aluminum, or different types of alloys and combinations of materials. However, other metal materials may also be used.

The material characteristics that are provided to the computer device 102 will depend on the specific material used.

According to the inventive method it is the material characteristics establishes boundary conditions for the folding, together with the geometrical relationship between the primary and secondary surface.

The material characteristic may include thickness, type of material, hardness toughness, tensile strength, yield strength, elongation, fatigue strength, corrosion, plasticity, malleability, creep and structure of the material and dimension of material, but may also include other characteristics. In one embodiment a DC01 steel sheet having a thickness in the range of from about 0.2 to about 2.5 mm may be used. The DC01 steel is a European standard cold-rolled quality low-carbon steel flat product for cold forming. In some application the steel may be thicker than 2.5 mm. Generally said structural steel may have a yield strength in the range of 100 to 1100 MPa, 0.2% offset, and a hardness (HV) in the range of 80 to 250, and a tensile strength in the range of 250 to 1100 MPa.

The material may be selected based on material properties, ductility requirements, toughness properties and through-thickness properties.

Preferably, the material is a plasticising material, meaning that the material is capable of being deformed without breaking.

Figure 5:
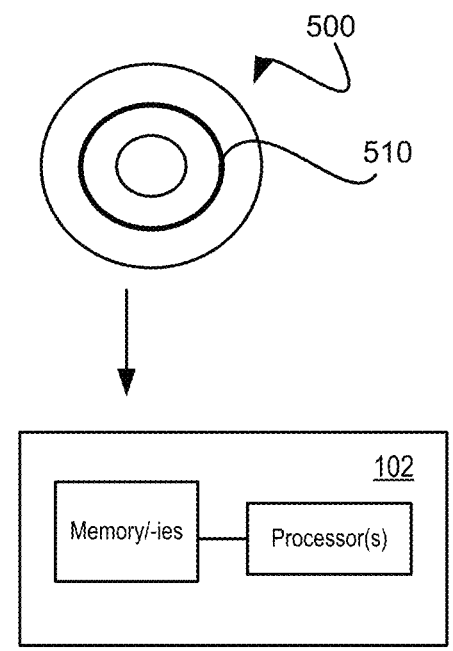
FIG. 5 illustrates a carrier comprising a computer program.

Turning now to FIG. 5, another aspect will be briefly discussed. FIG. 5 shows an example of a computer-readable medium, in this example in the form of a data disc 500. In one embodiment the data disc 500 is a magnetic data storage disc. The data disc 500 is configured to carry instructions 510 that can be loaded into a memory of a computer device 102. Upon execution of said instructions by a processor of the computer device 102, the computer device 102 is caused to execute a method or procedure according to any one of the embodiments described herein in conjunction with FIGS. 1 to 4. The data disc 500 is arranged to be connected to or within and read by a reading device (not shown), for loading the instructions into the processor. One such example of a reading device in combination with one (or several) data disc(s) 500 is a hard drive. It should be noted that the computer-readable medium can also be other mediums such as compact discs, digital video discs, flash memories or other memory technologies commonly used. In such an embodiment the data disc 500 is one type of a tangible computer-readable medium. The instructions may alternatively be downloaded to a computer data reading device, such as a computer device 102 capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the computer device 102. In such an embodiment, the computer-readable signal is one type of a non-tangible computer-readable medium.

Figure 6:
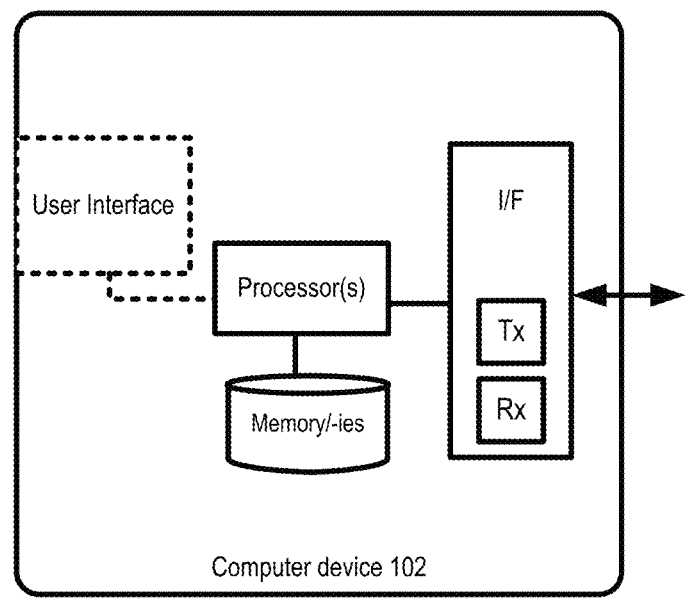
FIG. 6 illustrates an example implementation of a computer device.

With reference to FIG. 6, an example implementation of the computer device 102 of FIG. 1 will be described in some further detail. The computer device is configured to execute, or otherwise perform, any of the methods described above with reference to FIGS. 1 to 4 either by its own or as a part of a system. As is schematically illustrated in FIG. 6, the computer device 102 may comprise one or more processors and one or more memories. Also, a communications interface (I/F) may be provided in order to allow the computer device 102 to communicate with other devices and/or server systems, e.g. via a network such as the Internet. To this end, the communications interface (I/F) may comprise a transmitter (Tx) and a receiver (Rx). Alternatively, the communications interface (I/F) may comprise a transceiver (Tx/Rx) combining both transmission and reception capabilities. The communications interface (I/F) may include a radio frequency (RF) interface allowing the computer device 102 to communicate with other devices and/or server systems through a radio frequency band through the use of different radio frequency technologies such as, e.g., 5G NR (New radio), LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. The computer device 102 may further comprise a user interface, which may in some implementation be comprised of a display and a keypad. Advantageously, but not necessarily, the user interface 230 includes a touch-sensitive display. As such, the touch-sensitive display may be a touch screen display upon which virtual keys may be displayed and operated.

Examples

In one trial the inventive method was realized through a tool (MK2) having two grippers squeezing the metal plate on each side of the trestle and following the trestle by rolling up and down, while at the same time the plate is folded or bend more and more. Grip fingers for two industrial robots were designed with integrated ball bearings to be able to roll on the surface. The tests showed that the ball bearings must be mounted on the top to enable an accurate bend. Different types and design of tools and industrial robots may be used, and the inventive method is not limited to the use of the toll as described in the trial. As bending the plate in one single step was not considered possible when the robotic grippers follow the bending line, a step bending procedure was performed for the operation of the method.

The result of the trial is summarized in Table 1 below.

In one example (No 1) a conventional structural steel sheet, DC01 Steel (EN 10130, 1.0330 material), having a thickness of about 1.25 mm was used, in another example a DC01 steel sheet having a thickness of about 2 mm was used (No 4). The DC01 steel is a European standard cold-rolled quality low-carbon steel flat product for cold forming.

In one example (No 2) a stainless steel (EN 1.4301) having a thickness of 0.5 mm was used.

In one example (No 3) an aluminium-zinc sheet was used having a thickness of 1.25 mm.

TABLE 1

Results of trial

| Project no. | Tests | Results | Bends | Bend up [degrees] | Bend down [degrees] | Tool | Thickness [mm] | Material |
|---|---|---|---|---|---|---|---|---|
| 1 | 5 | Good due to small bending radius compared to target 60 degrees bend | 10 | 64 | 60 | MK2 | 1.25 | 1.25 mm grade DC 01 cold rolled steel |
| 2 | 5 | Good due to small bending radius compared to target 60 degrees bend | 10 | 60 | 59 | MK2 | 0.50 | 0.5 mm Stainless EN 1.4301 |
| 3 | 5 | Good due to small bending radius compared to target 60 degrees bend | 10 | 61 | 61 | MK2 | 1.25 | 1.25 mm Alu-Zink |
| 4 | 5 | Good due to small bending radius compared to target 60 degrees bend | 10 | 64 | 63 | MK2 | 2.00 | 2 mm grade DC cold rolled steel coil |

The trial showed good bending behaviour through the application of the inventive method as operated by the tool (MK2), in all examples.

In one alternative example a stainless steel having a yield strength 1300 MPa and a thickness in the range of 1.25 mm, was permanently folded by implementing the inventive method without prior tempering or heat treatment of the stainless steel. This was possible since, through the inventive method using robotic arms and roller folding, only one piece is folded at a time. In contrast to a straight fold, which is limited by the thickness of the material, the curve fold is tightened like a bow, which counteracts the effect and force of the material thickness and acts to lock the curve fold in place.

Modifications and other variants of the described embodiments will come to mind to one skilled in the art having benefit of the teachings presented in conjunction with FIGS. 1 through 6. In order to elucidate the aspects and embodiments of this disclosure even further, additional aspects and embodiments of the present disclosure will be described in connection with FIGS. 7-9.

Figure 7:
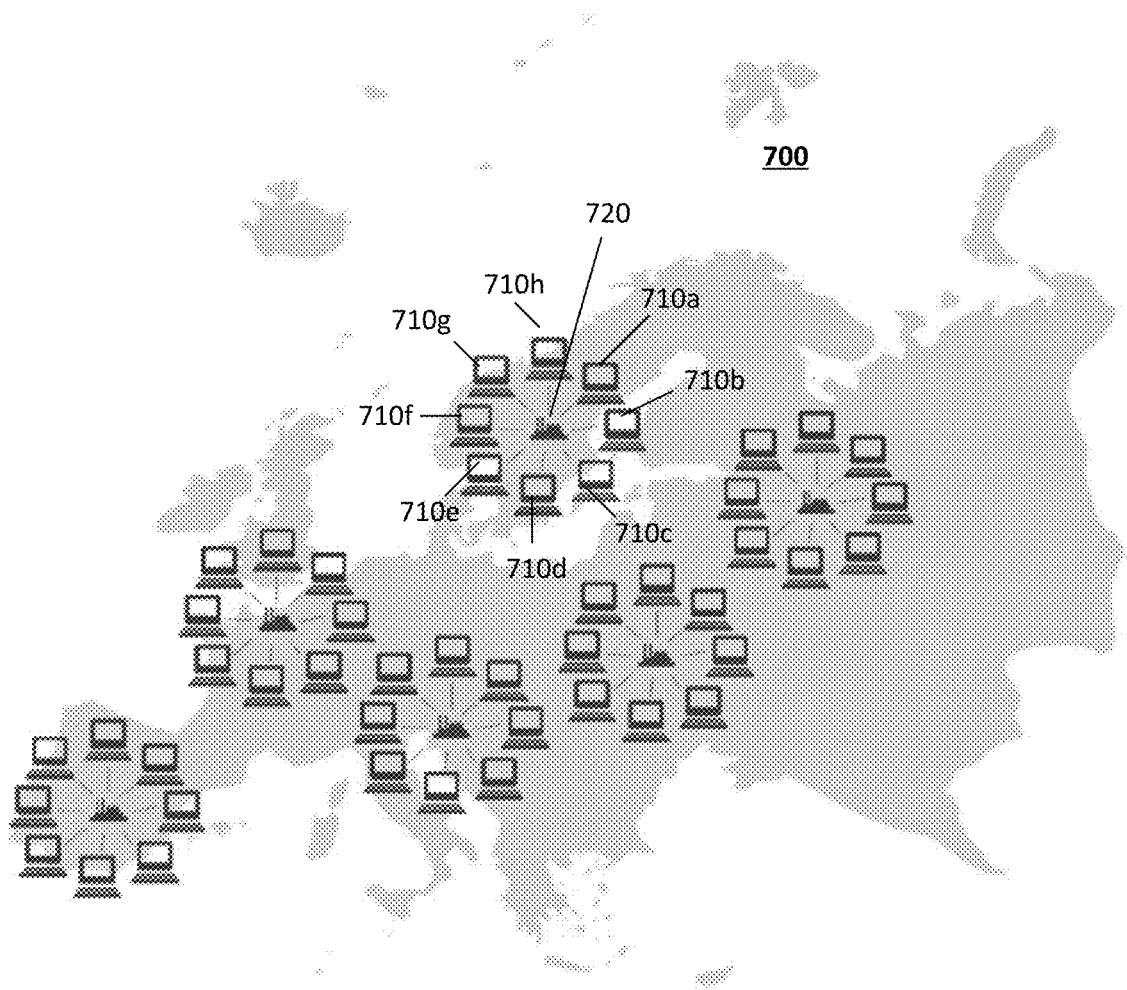
FIG. 7 illustrates a system in a distributed computing environment, wherein the system includes at least one computer device and at least one industrial robot at a distance from the at least one computer device.

FIG. 7 illustrates a system in a distributed computing environment, wherein the system 700 includes at least one computer device 710a-n and at least one industrial robot 720. As will be appreciated, there may exist several industrial robots, e.g., placed at different locations in Europe as is illustrated in the figure. It goes without saying that Europe is merely an example and the industrial robots can be placed in any desired continent. As can be seen in the figure, the one or more computer devices 710 may be located remotely (i.e., at a distance) from the industrial robots 720.

Figure 8:
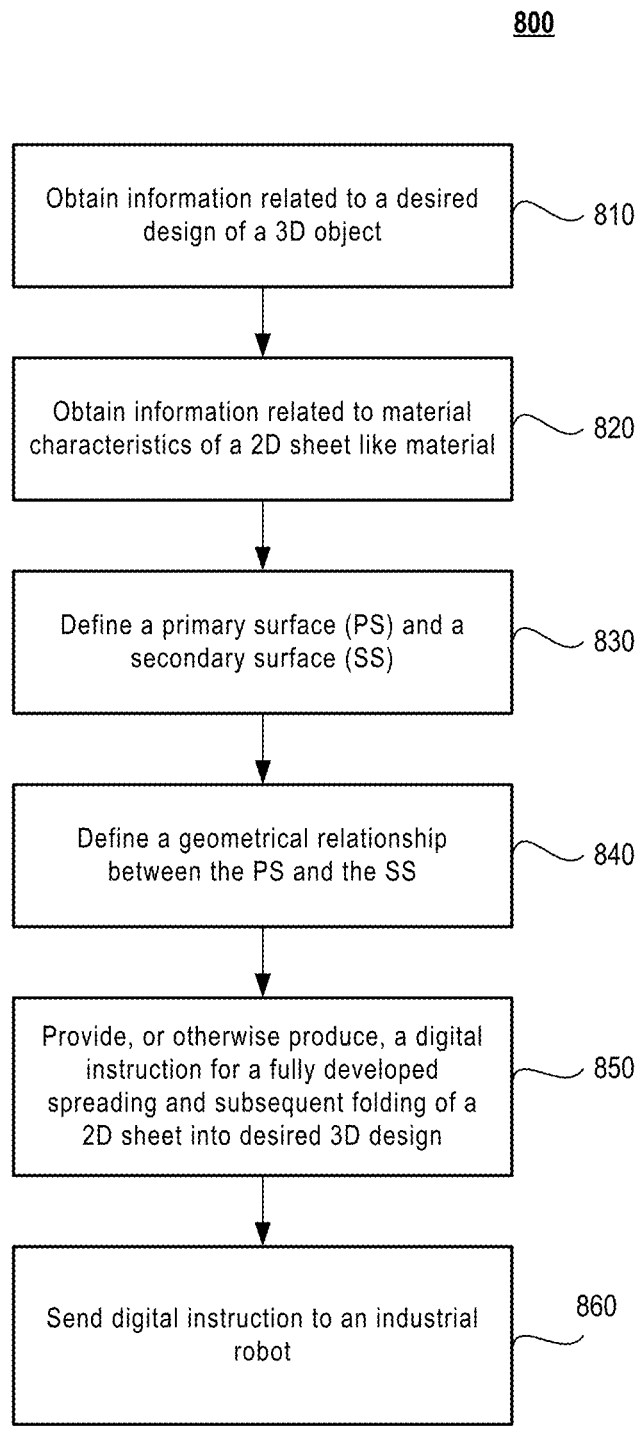
FIG. 8 shows a flowchart of a method performed by a computer device in accordance with an aspect of the invention.

FIG. 8 shows a flowchart of a method performed by a computer device 710a-n for use in material processing of a two-dimensional sheet like material.

Action 810: Information related to, or otherwise indicative of, a desired design of a three-dimensional object is obtained.

In some embodiments, the computer device 710a-n may receive this information, e.g., through a user interface operated by a user, or operator. In other embodiments, this information may be received from a remote computer device (not shown) communicating said information to the computer device 710a-n.

Action 820: Information related to material characteristics of the two-dimensional sheet like material is obtained. In some embodiments, the computer device 710a-n may receive this information, e.g., through a user interface operated by a user, or operator. In other embodiments, this information may be received from a remote computer device (not shown) communicating said information to the computer device 710a-n. In yet other embodiments, the computer device 710a-n may obtain this information by optically reading this information from a machine-readable code (e.g., a barcode such as QR code) printed on the two-dimensional sheet like material in question.

Action 830: A primary surface and a secondary surface of the desired design of the three-dimensional object are defined. This has been described earlier in this disclosure and will not be further described here.

Action 840: A geometrical relationship between said primary surface and secondary surface is defined, wherein the secondary surface (SS) is a reflection of the primary surface (PS) in a two-dimensional plane, and wherein when said primary surface (PS) is concave said secondary surface (SS) is convex, or when said primary surface (PS) is convex said secondary surface (SS) is concave. This has been described earlier in this disclosure and will not be further described here.

Action 850: A digital instruction for a fully developed spreading and subsequent folding of a two-dimensional sheet into the obtained desired design of the three-dimensional object is provided, or otherwise created. This digital instruction is based on the defined primary and secondary surfaces, respectively, and said obtained material characteristics. This has been described earlier in this disclosure and will not be further described here.

Action 860: Advantageously, the digital instruction is transmitted (i.e., sent) to an industrial robot for the spreading and subsequent folding of the two-dimensional sheet by means of the industrial robot.

Figure 9:
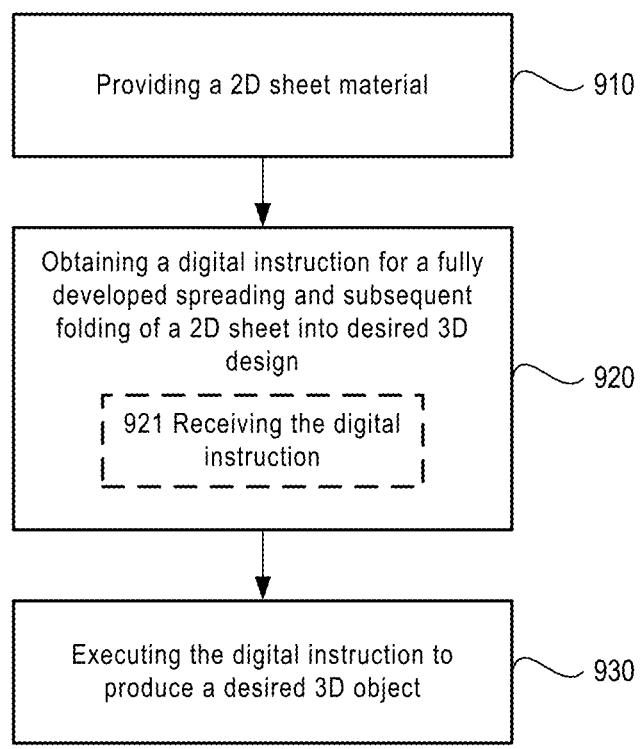
FIG. 9 shows a flowchart of a method performed by an industrial robot in accordance with an aspect of the invention.

FIG. 9 shows a flowchart of a corresponding method performed by an industrial robot for material processing of a two-dimensional sheet like material.

Action 910: A two-dimensional sheet like material is provided to the industrial robot.

Action 920: A digital instruction for the spreading and subsequent folding of the provided two-dimensional sheet by means of the industrial robot is obtained. In some embodiments, this action includes receiving 921 the digital instruction from a computer device which is typically, but not necessarily, located remotely from the industrial robot.

Action 930: The obtained digital instruction is executed in order to produce, or otherwise create/produce a desired design of a three-dimensional object from the provided two-dimensional sheet like material.

Figure 10:
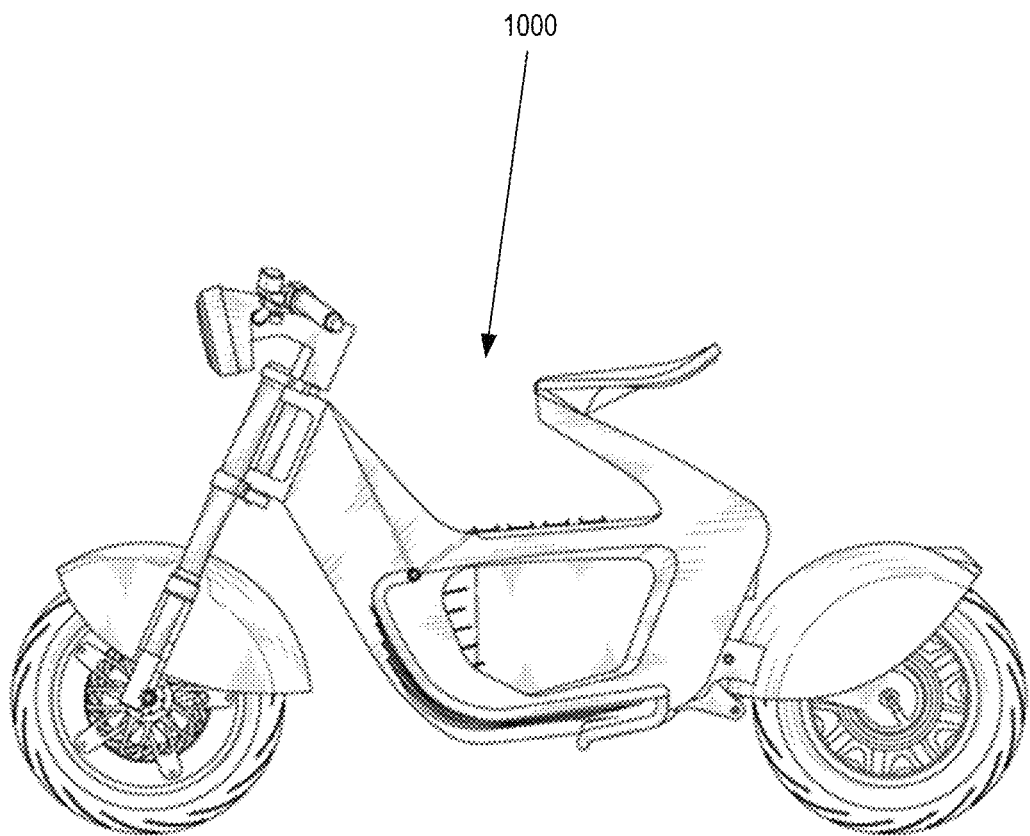
FIG. 10 shows a three-dimensional object formed according to the method of the invention.

An example of an object, which is possible to produce by means of the methods described in FIGS. 7-9 is shown for illustrative purposes in FIG. 10. In this example, the object is a 3D-object 1000 representing at least a part (chassis) of a motorbike. This 3D-object 1000 can then be used for the manufacture of a motorbike.

Other examples of conceivable objects include i) other vehicles (e.g., cars, trucks, trailers, boats, trains) or parts thereof, ii) furniture or parts thereof, iii) home appliances or parts thereof, iv) tools or parts thereof, v) industrial machines or parts thereof, and vi) constructions (e.g. buildings, bridges) or parts thereof.

Various aspects and embodiments described herein allow for an enhanced improved technique of material processing. The inventor has realized that where a, to a primary surface corresponding, secondary surface is defined, it is possible to create a digital instruction for a fully developed spreading and subsequent folding a two-dimensional sheet into a desired three-dimensional shaped object, without piecing together many different parts. By fully developed spreading is meant that the surfaces of the two-dimensional sheet object are pieced together, which means that the desired three-dimensional object formed thereof does not require piecing together many different parts. The implementation of curve folding enables creation of a larger volume for a technical volume, e.g. batteries or other equipment, without compromising the design. This is largely because with the curve folding it is possible to incorporate a volume without additional folds, as compared to folding over straight lines.

Furthermore, it is advantageous to allow for a distributed computing solution. This adds flexibility in that the digital instruction can be provided, or otherwise created by a computer device at one location and being sent to an industrial robot(s) at a second location for the material processing per se of the two-dimensional sheet material into the desired three-dimensional shape object. For example, the computer device may be located in Sweden and the industrial robot(s) in Australia. In a possible use case scenario, a user in Sweden defines a desired 3D object as well as material characteristics for the two-dimensional material desired to be used in the material processing. A computer device operated by the user in Sweden can obtain information related to the desired 3D design and the material characteristics of the two-dimensional material desired to be used in the material processing. A digital instruction for a fully developed spreading and subsequent folding of a two-dimensional sheet into the obtained desired design of the three-dimensional object can then be provided, wherein this digital instruction is based on defined primary and secondary surfaces, respectively, and said material characteristics. The digital instruction may be communicated to the industrial robot(s) in Australia. When the two-dimensional material is provided to the industrial robot(s) in Australia and said industrial robot(s) receive(s) the digital instruction, the industrial robot(s) may execute the digital instruction and thereby create, or otherwise, produce the desired 3D design. In addition to the flexibility, this also allows for additional dimensions in customization of the production of 3D objects in different materials such as metal or plastics materials. It is also believed that this distributed solution for the material processing may advantageously reduce the overall CO2 footprint when manufacturing certain products such as vehicles (e.g., motor bikes), furniture or the like. Furthermore, the innovative method for processing of a two-dimensional object allows for the use of less material, and fewer manufacturing steps, which further adds to the overall reduction in the CO2 footprint. In FIG. 10 a three-dimensional object 1000 is illustrated formed from a two-dimensional sheet material through the innovative method.

Figure 11A:
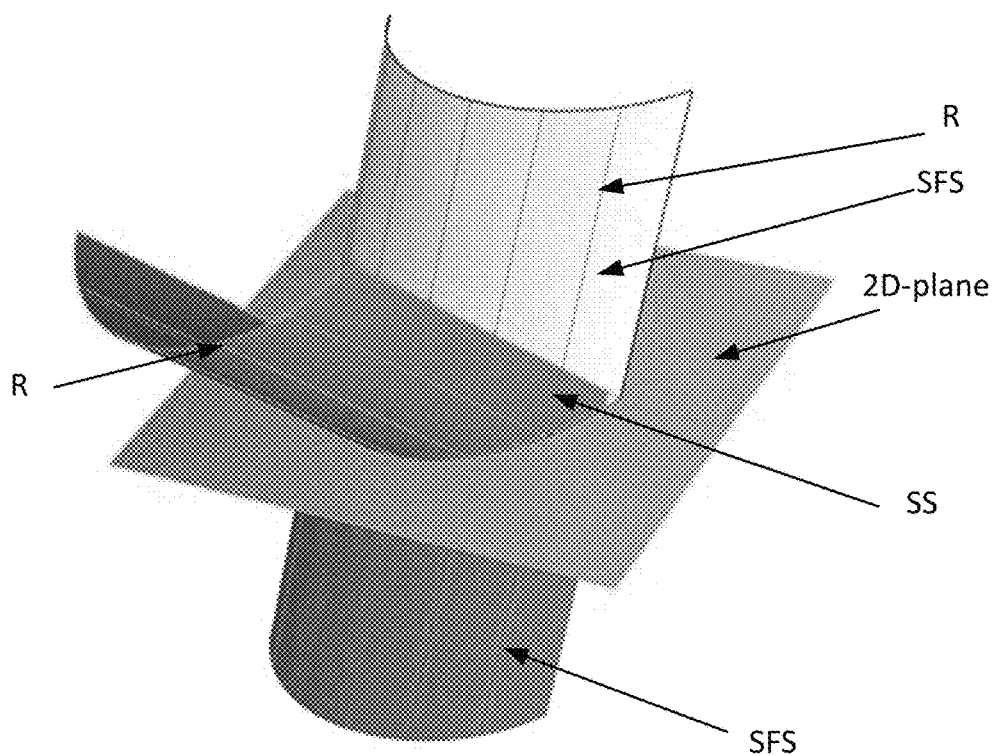
FIGS. 11a-b are example illustrations of mathematical and geometrical rules that may be used in the method described in this disclosure.
Figure 11B:
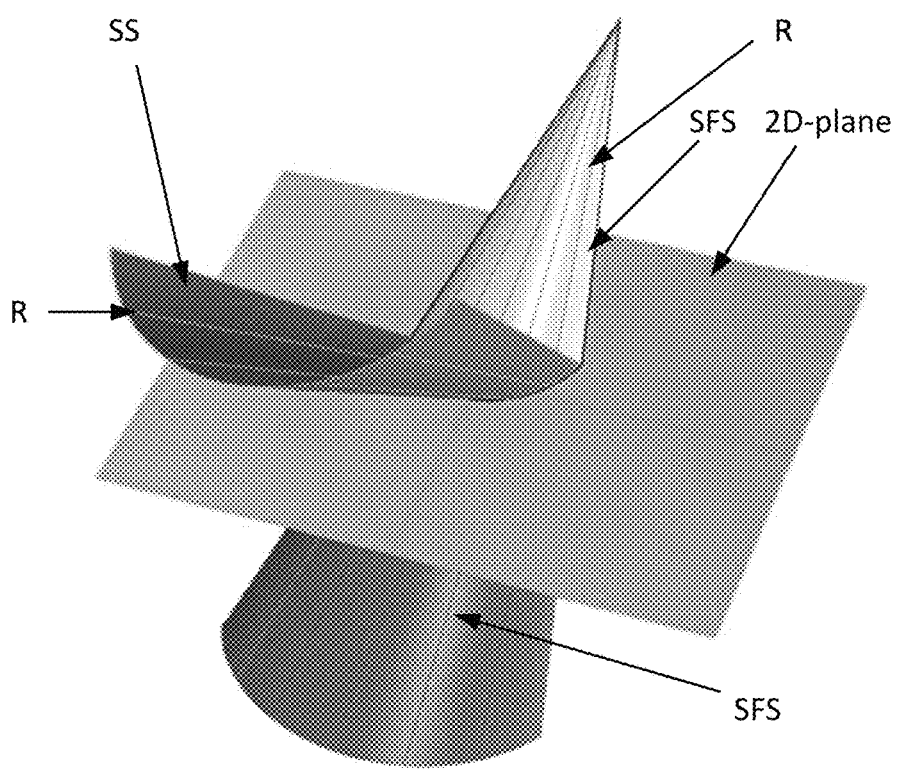

FIGS. 11a and 11b are further illustrations of the mathematical and geometrical rules in the method as defined above, which may also be called a ruling based design method. FIG. 11a shows a single folded surface (SFS), having parallel rulings (R), i.e. a parallel single folded surface or cylindrical single curved surface. FIG. 11b shows a non-parallel single folded surface (SFS) or a segment of a cone, the non-parallel rulings (R) have a single focal point, i.e. this is a conical single curved surface.

The rulings (R) illustrate where the single folded surface (SFS) is straight. A single folded surface is only straight in one direction, and as defined by the ruling. The rulings are thus the straight intersections SI along the single folded surface.

As seen in both FIGS. 11a and 11b the (imaginary) two-dimensional plane (2D-plane), or a mirror plane, or cut plane, is illustrated as intersecting the single curved surface. The mirror plane is strictly a two-dimension plane.

The mirror plane further defines the primary surface PS (i.e. the single folded surface above the mirror plane) and secondary surface SS, as described above. The secondary surface is thus the surface as reflected in the mirror plane. The secondary surface is thus a reflection of the single folded surface as reflected in the mirror plane. In FIGS. 11a and 11b the original surface single folded surface is illustrated under the mirror plane, however, this is only an imaginary surface showing the reflected surface, i.e. the surface forming the secondary surface.

The rulings of the primary single folded surface are also shown as reflected in the mirror plane.

The curve fold is defined in or by the intersection between the primary and secondary surface (or the mirror plane).

That means that the curve fold CF is defined where the primary surface is reflected in the mirror plane, in the intersection between two surfaces. The folding is performed by folding along a curve of the two-dimensional sheet, wherein said curve is defined over a two-dimensional plane. Where the two-dimensional (mirror) plane crosses a single folded surface an intersection is created, and wherein the secondary surface is a reflection of the surface under said two-dimensional plane and is reflected through said two-dimensional plane. This further means that it may either be the primary surface that controls the design of three-dimensional object or the curve controls the design of three-dimensional object, i.e. by controls the design is meant setting the geometrical and mathematical boundaries for the three-dimensional design.

Numbered Example Embodiments

The technology described in this disclosure thus encompasses without limitation the following numbered example embodiments (NEE). It should be appreciated that the numbered example embodiments are listed for the purpose of facilitating the understanding of various aspects and embodiments of this disclosure. The numbered example embodiments are not claims that define the scope of protection conferred. The appended claims of the disclosure define the invention and, accordingly, the scope of protection conferred.

NEE1. A method performed by a computer device (102) for material processing of a two-dimensional sheet like material, the method comprising:
obtaining (101) information related to a design of a three-dimensional object,
obtaining (102') information related to material characteristics of said material,
defining (102") at least one primary surface and at least one secondary surface, and a geometrical relationship (102''') between said primary surface and secondary surface, wherein the secondary surface (SS) is a reflection of the primary surface (PS) in a two dimensional plane, and wherein if said primary surface (PS) is concave said secondary surface (SS) is convex, or if said primary surface (PS) is convex said secondary surface (SS) is concave;
providing a digital instruction for spreading (103) and subsequent folding (104) of a two-dimensional sheet, wherein said digital instruction is based on the defined primary and secondary surfaces, respectively, and said material characteristics.

NEE2. The method according to NEE 1, wherein providing said digital instruction for spreading (103) and subsequent folding (104) of a two-dimensional sheet comprises:
transmitting said digital instruction to an industrial robot for the spreading (103) and subsequent folding (104) of the two-dimensional sheet by means of the industrial robot.

NEE3. The method according to NEE 2, wherein the industrial robot is located remotely from the computer device (102).

NEE4. The method according to any one of the preceding NEEs, wherein said folding is performed by folding along a curve (CF) of the two-dimensional sheet, wherein said curve is defined over a two-dimensional plane.

NEE5. The method according to NEE 4, wherein where said two-dimensional plane crosses a single folded surface an intersection is created, and wherein the secondary surface is a reflection of the surface under said two-dimensional plane and is reflected through said two-dimensional plane.

NEE6. The method according to any of the preceding NEEs, wherein said material characteristics are any one or a combination of thickness, type of material, hardness toughness, tensile strength, yield strength, elongation, fatigue strength, corrosion, plasticity, malleability, creep and structure of the material and dimension of material, and wherein said material characteristics define boundary conditions for said folding of said two-dimensional sheet.

NEE7. The method according to any one of the preceding NEEs, wherein said primary surface is the surface that controls the design of three-dimensional object.

NEE8. The method according to any one of NEEs 1 to 6, wherein said curve controls the design of three-dimensional object.

NEE9. The method according to any of the preceding NEEs, wherein said three-dimensional shape design is further defined by an interface design based on a technical volume and ergonomic requirements of the three-dimensional shape object.

NEE10. The method according to any of the preceding NEEs, wherein the folding is performed by industrial robots through straight intersections of said curve fold.

NEE11. The method according to NEE 10, wherein said folding is performed such that at least one composite pair of a convex and concave surfaces is formed, thereby forming said three-dimensional shaped object.

NEE12. The method according to any of the preceding NEEs, wherein said two-dimensional sheet material is any one of a metal or plastics material.

NEE13. The method according to NEE 12, wherein said metal material is any one of a steel, a stainless steel and an aluminum.

NEE14. The method according to any of the preceding NEEs, wherein said material is a stainless steel having a yield strength in the range of 1100 to 1400 MPa and a thickness in the range of 1 to 1.50 mm, characterized in that said material is folded without prior tempering of said material.

NEE15. An object in form of a three-dimensional geometrical shape, wherein said material has been folded from a two-dimensional sheet material into said three-dimensional geometrical shape object by the method as defined in any of NEEs 1 to 14.

NEE16. Use of the object as defined in NEE 15, for the manufacture of any one of a vehicle, a furniture, a tool.

NEE17. A computer program comprising instructions which, when executed on at least one processor, cause the at least one processor to carry out the method according to any one of NEEs 1 to 14.

NEE18. A carrier comprising the computer program of NEE 17, wherein the carrier is one of an electronic signal, an optical signal, a radio signal or a computer readable storage medium.

NEE19. A computer device comprising a processor and a memory, said memory comprising instructions executable by said processor whereby said computer device is operative to perform the method according to NEE 1 to 14.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation.

Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims (or embodiments), these may possibly advantageously be combined, and the inclusion of different claims (or embodiments) does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method performed by a computer device for use in material processing of a two-dimensional sheet material, the method comprising:
   obtaining information related to a desired design of a three-dimensional object;
   obtaining information related to material characteristics of the two-dimensional sheet material;
   defining a primary surface and a secondary surface of the desired design of the three-dimensional object;
   defining a geometrical relationship between said primary surface and secondary surface, wherein
   the secondary surface is a reflection of the primary surface in a two-dimensional plane, and wherein
   when said primary surface is concave said secondary surface is convex, or when said primary surface is convex said secondary surface is concave;
   providing, or otherwise creating, a digital instruction for a fully developed spreading and subsequent folding of a two-dimensional sheet into the obtained desired design of the three-dimensional object, wherein said digital instruction is based on the defined primary and secondary surfaces, respectively, and said obtained material characteristics; and
   transmitting said digital instruction to an industrial robot for the spreading and subsequent folding of the two-dimensional sheet by means of the industrial robot.

2. The method of claim 1, wherein the computer device is integral with the industrial robot.

3. The method of claim 1, wherein the industrial robot is separate and distinct from the computer device and is located remotely from the computer device.

4. The method of claim 1, wherein said folding is performed by folding along a curve of the two-dimensional sheet, wherein said curve is defined over a two-dimensional plane.

5. The method of claim 4, wherein where said two-dimensional plane crosses a single folded surface an intersection is created, and wherein the secondary surface is a reflection of the surface under said two-dimensional plane and is reflected through said two-dimensional plane.

6. The method of claim 1, wherein said material characteristics are any one or a combination of thickness, type of material, hardness toughness, tensile strength, yield strength, elongation, fatigue strength, corrosion, plasticity, malleability, creep and structure of the material and dimension of material, and wherein said material characteristics define boundary conditions for said folding of said two-dimensional sheet.

7. The method of claim 1, wherein said primary surface is the surface that controls the desired design of three-dimensional object.

8. The method of claim 4, wherein said curve controls the desired design of three-dimensional object.

9. The method of claim 1, wherein said desired design of three-dimensional object is further defined by an interface design based on a technical volume and ergonomic requirements of the three-dimensional object.

10. The method of claim 1, wherein the folding is performed by said industrial robot through straight intersections of a curve fold.

11. The method of claim 10, wherein said folding is performed such that at least one composite pair of a convex and concave surfaces is formed, thereby forming said desired design of the three-dimensional object.

12. The method of claim 1, wherein said two-dimensional sheet material is any one of a metal or plastics material.

13. The method of claim 12, wherein said metal material is any one of a steel, a stainless steel and an aluminum.

14. The method of claim 1, wherein said material is a stainless steel having a yield strength in the range of 1100 to 1400 MPa and a thickness in the range of 1 to 1.50 mm, characterized in that said material is folded without prior tempering of said material.

15. A method performed by an industrial robot for material processing of a two-dimensional sheet material, the method comprising:
   providing a two-dimensional sheet material;
   obtaining a digital instruction for spreading and subsequent folding of the provided two-dimensional sheet material by means of the industrial robot, wherein obtaining the digital instruction for the spreading and subsequent folding of the provided two-dimensional sheet material comprises: receiving said digital instruction from a computer device; and
   executing the obtained digital instruction to produce, or otherwise create, a desired design of a three-dimensional object from the provided two-dimensional sheet like material.

16. The method of claim 15, wherein the computer device is integral with the industrial robot.

17. The method of claim 15, wherein the industrial robot is separate and distinct from the computer device and is located remotely from the computer device.

* * * * *

UNITED STATES PATENT AND TRADEMARK OFFICE
CERTIFICATE OF CORRECTION

PATENT NO. : 12,290,934 B2
APPLICATION NO. : 17/895344
DATED : May 6, 2025
INVENTOR(S) : Beijer It is certified that error appears in the above-identified patent and that said Letters Patent is hereby corrected as shown below:

On the Title Page

Page 2, Column 2, Line 15 ((56) Other Publications), delete "to: Cruved Folding" and insert -- to: Curved Folding --.

In the Specification

Column 13, Line 33, delete "computer device." and insert -- computer device; --.

In the Claims

Column 23, Line 46, Claim 5, delete "wherein where said" and insert -- wherein said --.

Column 24, Lines 45-46, Claim 15, delete "sheet like material." and insert -- sheet material. --.

Signed and Sealed this
First Day of July, 2025

Coke Morgan Stewart
*Acting Director of the United States Patent and Trademark Office*